(12) United States Patent
Zhadanov et al.

(10) Patent No.: US 6,187,186 B1
(45) Date of Patent: *Feb. 13, 2001

(54) DEVICE FOR INTRODUCING SUBSTANCES INTO WATER

(76) Inventors: Sam Zhadanov; El Zhadanov, both of 2942 W. 5th St., Brooklyn, NY (US) 11214

(*) Notice: Under 35 U.S.C. 154(b), the term of this patent shall be extended for 0 days.

This patent is subject to a terminal disclaimer.

(21) Appl. No.: 09/306,024

(22) Filed: May 6, 1999

(51) Int. Cl.[7] .................................................. E03B 11/00
(52) U.S. Cl. .................. 210/198.1; 137/268; 137/625.48; 137/895; 210/136; 422/261; 422/266
(58) Field of Search .................................. 239/310, 317, 239/318; 137/268, 625.18, 625.48, 895, 205.5, 564.5; 210/198.1, 136; 422/261, 266; 222/484

(56) References Cited

U.S. PATENT DOCUMENTS

| | | | |
|---|---|---|---|
| 2,113,203 | * | 4/1938 | Straubel . |
| 2,381,589 | * | 8/1945 | Hayes . |
| 2,562,415 | * | 7/1951 | Chase . |
| 2,604,446 | * | 7/1952 | Palmer . |
| 2,680,044 | * | 6/1954 | Smith . |
| 3,390,695 | * | 7/1968 | King et al. . |
| 3,984,053 | * | 10/1976 | Hechler, IV . |
| 4,340,078 | * | 7/1982 | Pasley . |
| 5,303,729 | * | 4/1994 | DeMarco . |
| 5,730,178 | * | 3/1998 | Zhadanov et al. . |

* cited by examiner

*Primary Examiner*—W. L. Walker
*Assistant Examiner*—Terry K. Cecil
(74) *Attorney, Agent, or Firm*—I. Zborovsky

(57) ABSTRACT

Described is a device for introducing substances into water. The device includes a housing (1) forming first and second chambers (7, 9) separated by a partition (8). Throughgoing housing openings (11, 12) are provided on either side of the partition to allow each chamber to communicate with the container (21) supplying the substance. A connecting flange (15) having throughgoing flange openings (19, 20) is provided for connecting the housing to the container. The flange is arranged turnably relative with the housing such that in an operative condition each throughgoing housing opening coincides with a respective throughgoing flange opening. The turnable arrangement also includes at least one pin (17) located on the flange and which engages at least one groove (88) formed in the housing. A controlling means (24) is also provided in an opening (25) of the partition. In one embodiment the controlling means is a flexible diaphragm with a passage that reduces and increases in response to elastic deformation caused by a pressure difference between the first and second chambers. In another embodiment, the controlling means is a spring-biased control member (29) which prevents return flow.

11 Claims, 4 Drawing Sheets

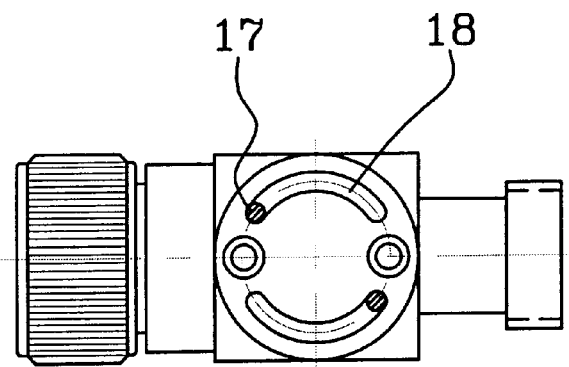
*FIG.2*
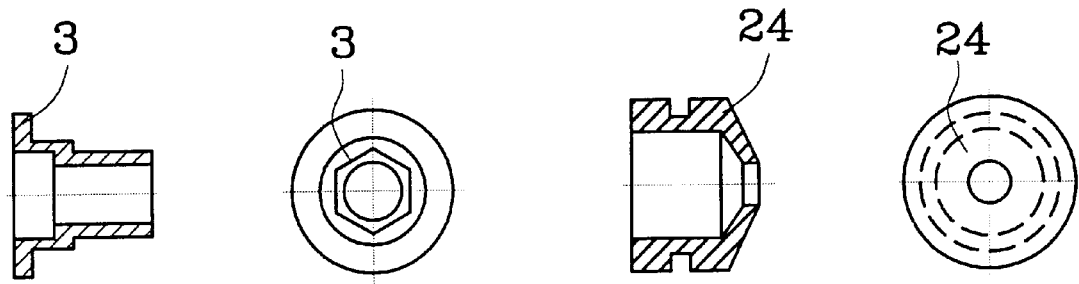
*FIG.3*        *FIG.4*

DEVICE FOR INTRODUCING SUBSTANCES INTO WATER

BACKGROUND OF THE INVENTION

The present invention relates to devices for introducing substances into water, for example for producing solutions to be used in showers, in sanitary systems, for washing of objects, for spraying, etc.

Some devices of this type are disclosed for example in U.S. Pat. No. 5,730,178. They can be further improved so as to provide a better control of the water in substance supply, to improve turning on and off of the device, to improve fixation system, to stabilize a substance consumption corresponding to the individual conditions in water systems, and also to expand the range of its use for technical applications.

SUMMARY OF THE INVENTION

Accordingly, it is an object of present invention to provide a device for introducing substances into water which is a further improvement of the existing devices.

In keeping with these objects and with others which will become apparent hereinafter, one feature of the present invention resides, briefly stated, in a device for introducing substances into water, which has a housing forming a first chamber communicatable with a water supply, a second chamber communicable with a consumer, and a partition separating the first chamber from the second chamber and having an opening, connecting means including first communicating means which communicate the first chamber with a source of substance so that water supplied from the source of water through the first chamber flows into the source of substance, and second communicating means which communicate the source of substance with the second chamber so that a mixture of water and substance is supplied from the source of substance into the second chamber, a connecting flange for connecting said housing with the source of substance, said first communicating means being formed as a first throughgoing housing opening, said second communicating means being formed as a second throughgoing housing opening, and said connecting flange has a first and a second flange openings, said flange being movable relative to said housing so that said first and second flange openings coincide with said first and second throughgoing housing openings in an operational condition of the device, and are offset relative to one another in an inoperational condition of the device; and sealing means provided in the region of said first and second throughgoing housing openings for preventing leaks between said housing and said connecting flange.

In accordance with a further feature of the present invention the device has means for attaching said housing to the source of water, said attaching means including a nut, and an inner bushing introducable into an end opening of said housing and fixed in said end opening.

Still a further feature of present invention resides, in the device in which said control means is formed so as to prevent a return flow of the substance into the source of water.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a section of the inventive device;

FIG. 3 is a view showing a bushing which is used for fixing and sealing purposes of the inventive device;

FIG. 4 is a view showing a control member for controlling a flow of the inventive device;

DESCRIPTION OF PREFERRED EMBODIMENTS

Figure 1:
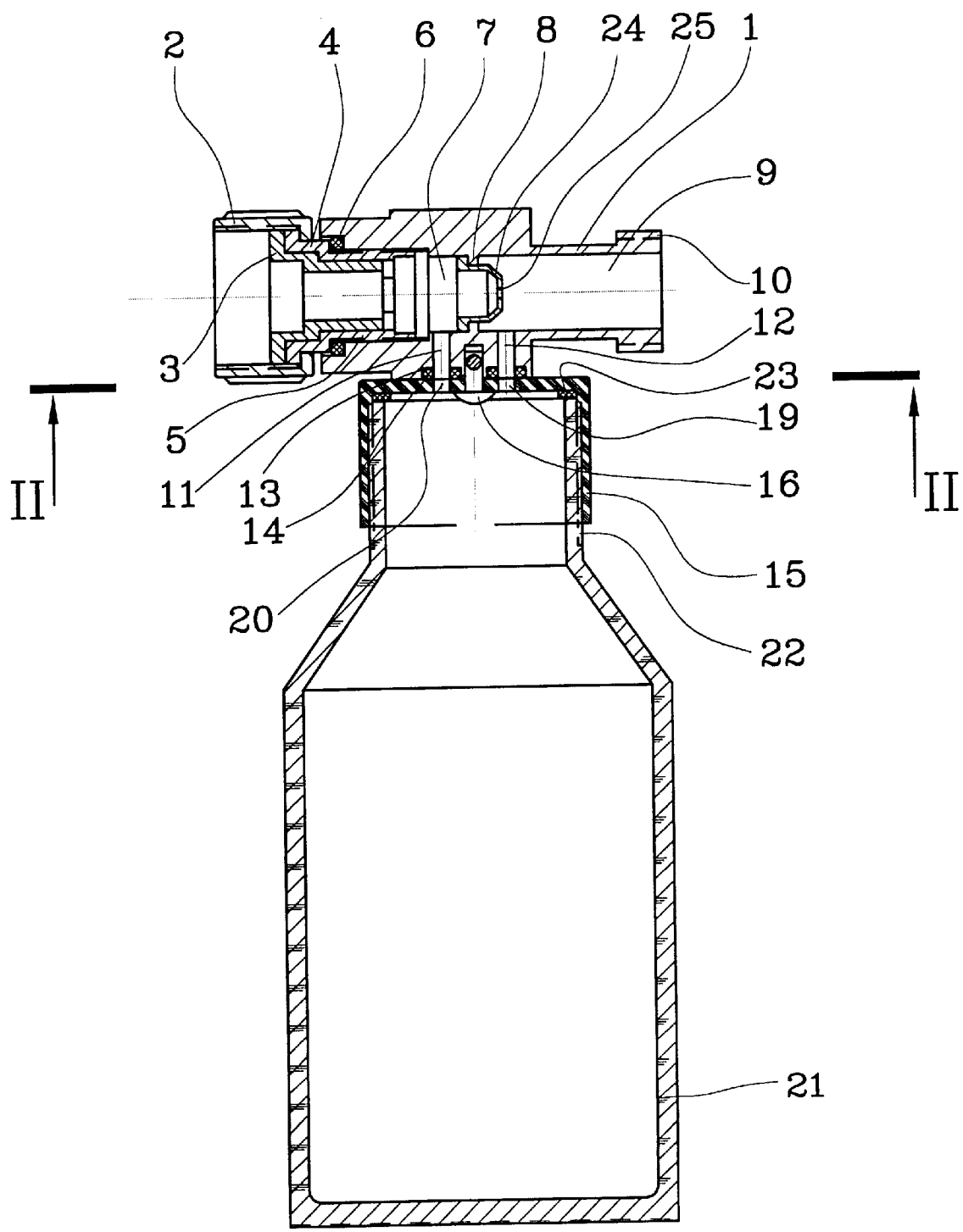
FIG. 1 is a view showing a cross-section of a device for introducing substances into water in accordance with one embodiment of the present invention.

A device for introducing substances into water has a housing which is identified with reference numeral 1. It is connectable with a water source, for example with a pipeline by a nut 2 with an inner thread and a fixing bushing 3 which is shown in more detail in FIG. 3. The nut 2 is fixed to the housing 1 by a threaded flange 4 which has an inner hexagonal cross-section and is provided with an outer seal 6. The housing 1 has a first chamber which is identified with reference numeral 7, a partition 8, and a second chamber 9. The partition 8 separates the chambers 7 and 9 from each other and has a central opening. The housing 1 has an outer threaded portion 10 for attachment of a showerhead or any other consumer device.

The housing has two throughgoing openings 11 and 12 which are located at both sides of the partition 8. Each opening 11 and 12 is provided with an annular recess 13. Seals 14 formed for example as O-rings are located in the recesses 13. The device further has a threaded flange 15 which is connected to the housing 1 turnably via a pin 16. Two pins 17 shown in FIG. 2 extend from the flange 15 and engage in grooves 18 which are provided in an inner part of the housing 1. The upper wall of the flange 15 also has two flange openings 19 and 20.

Reference numeral 21 identifies a container with a substance to be introduced into water. It has an outer thread 22 with which it is screwed into the inner thread of the flange 15 and sealed by a seal 23. The flange 15 is turnable around an axis of the flange between an operative position in which the flange openings 19 and 20 coincide with the throughgoing housing openings 11 and 12 so that water flows from the first chamber 7 into the container 21, is mixed in the container with the substance, and then the mixture flows into the second chamber 9 and to a consumer. The flange 15 can be turned to an inoperative position in which the openings 19 and 20 do not coincide with the openings 11 and 12, so that there is no communication between the chambers 7 and 9 and the interior of the container 21.

A control member 24 is arranged in the opening of the partition 8. It can be formed for example as a diagram shown in FIG. 4. When water flows through an opening of the diaphragm 24, a resistance is provided so that a pressure difference is produced between the first chamber 7 and the second chamber 9. This difference depends on the size of the opening 25 of the diaphragm. On the other hand, a flow rate and concentration of the solution from the container 21 depends from the pressure difference between the chambers 7 and 9. Since water systems have various pressures, the pressure difference between the chamber 7 and 9 can be very high if the opening in the partition between the chambers is constant, and at low pressures the pressure difference can drop to zero so that there will be no supply of the solution, while in the conditions of high pressure difference the solution will be immediately washed out from the container.

The diaphragm 24 is composed of elastic material, for example rubber, and its hardness is selected experimentally so as to control the pressure difference. When there is a high water supply pressure, the opening 25 of the diaphragm opens so as to increase a water flow rate, while in condition of low water supply pressure the opening 25 of the diaphragm narrows so as to maintain the pressure difference.

The device in accordance with the present invention is very convenient for installation in a shower system since it provides a convenient location of the container 21 for the user. For this purpose the nut 2 is utilized in combination with the bushing 3 which is formed as a plastic or rubber bushing and simultaneously forms a seal and a fixator. The fixation is provided by the polygonal (for example hexagonal) cross-section of the end of the bushing 3 which is inserted into the inner polygon of the flange 5, so that the housing can not turn any longer on the pipeline.

The seals 14 arranged in the recesses 13 of the throughgoing housing openings 11 and 12 prevent leaks between the flange 15 of the container 21 and the housing 1. Therefore, a reliable tightness and a simple manufacture are guaranteed. It is to be understood that the seals 14 can be instead arranged in the flange openings 19 and 20.

Figure 5:
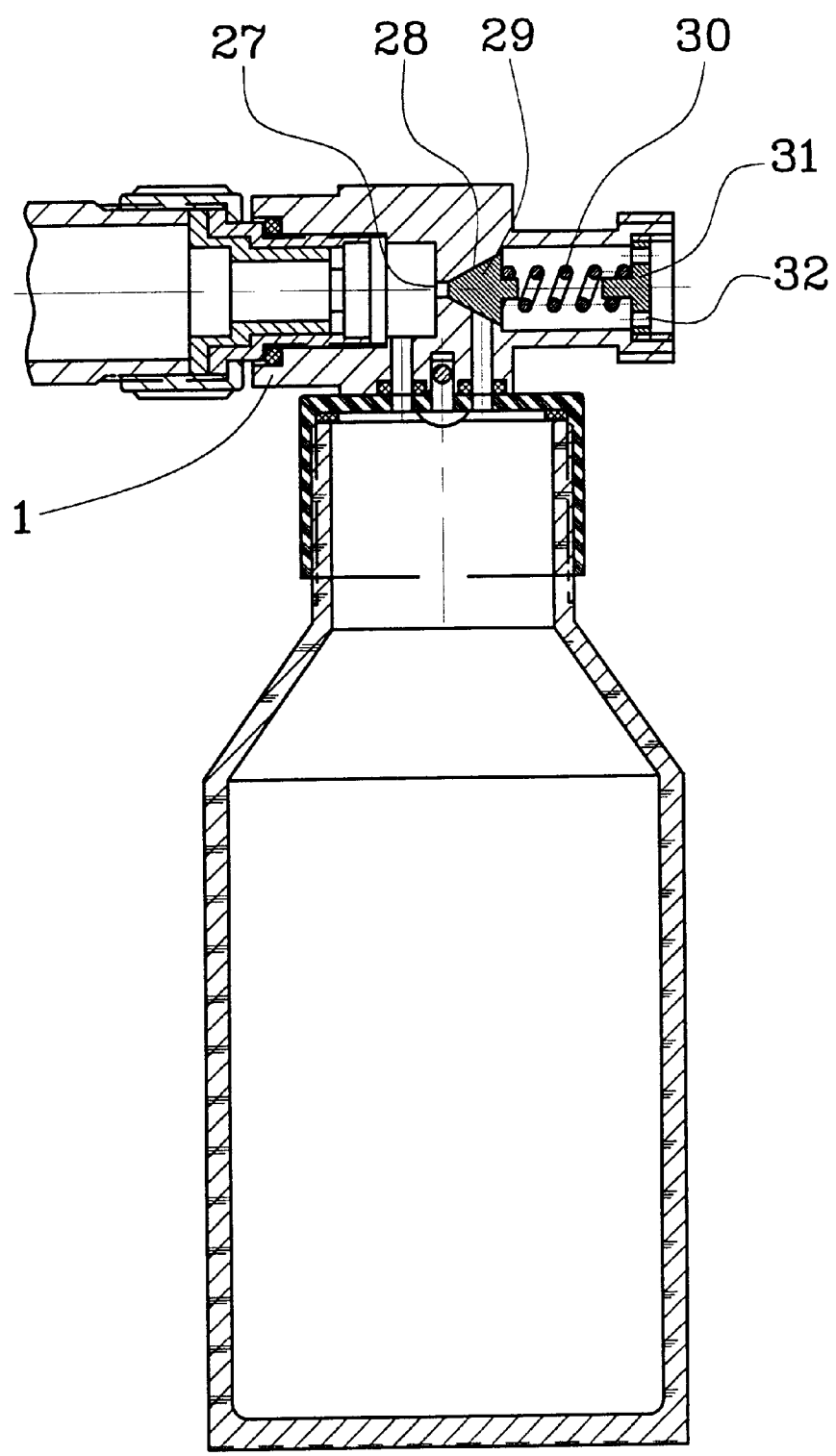
FIG. 5 is a view showing a device for introducing substances into water in accordance with another embodiment of the present invention.

When the device is used for technical purposes, it is necessary to prevent a backflow of the substance into the pipeline. FIG. 5 shows another embodiment of the present invention. In accordance with this embodiment, the partition between the chambers 7 and 9 has a cylindrical opening 27 and a conical opening portion 28. The control member 29 is arranged in the conical opening portion 28 and is spring-biased by a spring 30. A perforated further partition 31 provided with openings 32 is located in the region of an outlet 34 of the housing 1.

When water enriched with the substance flows out of the housing 1, the control member 29 which is formed as a conical member deviates from the conical opening portion 28 so as to form a gap therebetween to allow water to flow from the chamber 7 into the chamber 9, and thereafter through the openings 32 of the partition 31, while the solution of the water with the substance flows from the container 21 through the aligned openings 19 and 12. In the event of a back pressure, the control member 29 is firmly pressed against the conical opening portion 28 so that the opening 27 between the chambers 7 and 9 is closed, and also the throughgoing housing opening 12 is closed as well. As a result, the solution can not flow back into the chamber 7 neither from the chamber 9 nor from the container 21.

Figure 6:
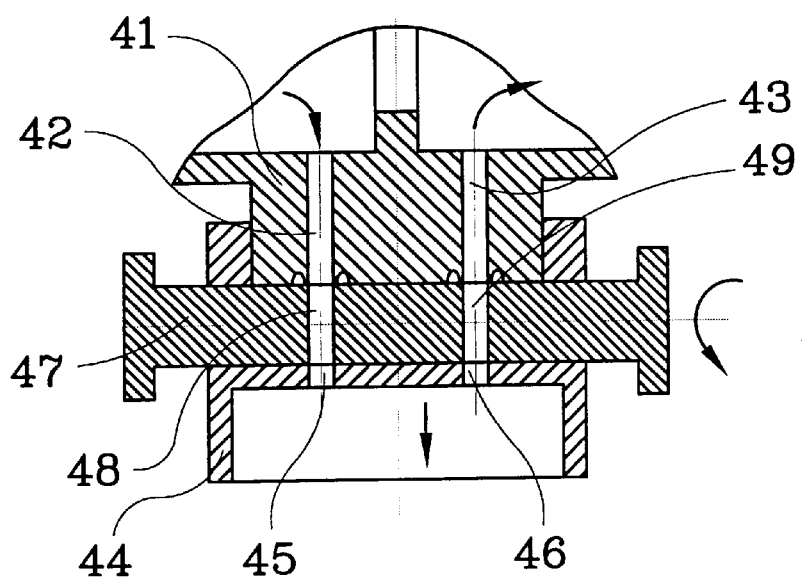
FIGS. 6 and 7 are views showing a device in accordance with another embodiment of the present invention in operative and inoperative positions.
Figure 7:
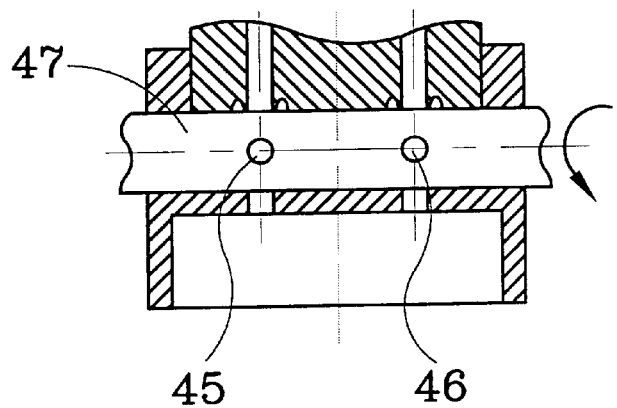

In the embodiment of FIGS. 6 and 7 a housing 41 having openings 42 and 43 is connected immovably with a flange 44 which has openings 45 and 46. A slider 47 provided with openings 48 and 49 is turnable around an axis which is perpendicular to the axis of the flange between an operative position in which the openings 42, 45, 48 and 43, 46, 49 coincide with one another to provide throughgoing flows, and an inoperative position in which the openings 48 and 49 are angularly displaced and a material of the slider 47 interrupts the communication between the openings 42, 45 and 43, 46 correspondingly.

Figure 8:
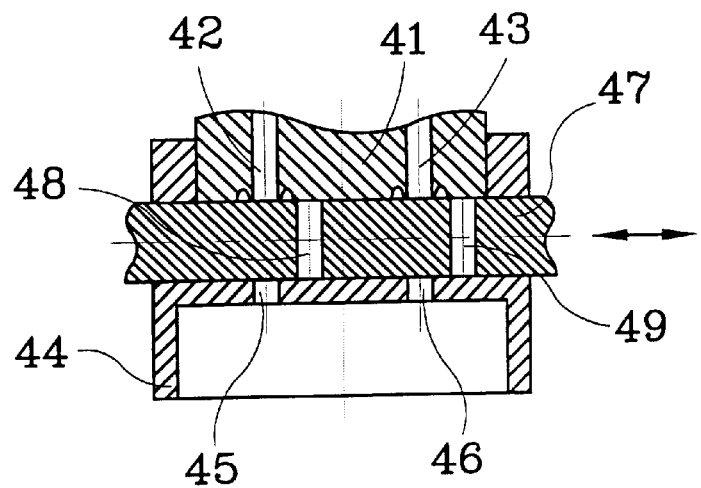
FIG. 8 is a view showing a further embodiment of the inventive device.

The device in accordance with the embodiment shown in FIG. 8 substantially corresponds to the device of the embodiment of FIGS. 6, 7. The only difference here is that in the device shown in FIG. 8 the slider 47' is not turnable, but instead is translatorily displaceable between the operative and inoperative position.

It will be understood that each of the elements described above, or two or more together, may also find a useful application in other types of constructions differing from the types described above.

While the invention has been illustrated and described as embodied in device for introducing substances into water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A device for introducing substances into water, comprising a housing forming a first chamber communicable with a water supply, a second chamber communicable with a consumer device, and a partition separating said first chamber from said second chamber and having an opening; connecting means including first communicating means which communicate said first chamber with a source of substance so that water supplied from the source of water through said first chamber flows into the source of substance, and second communicating means which communicate the source of substance with said second chamber so that a mixture of water and substance is supplied from the source of substance into said second chamber; a connecting flange for connecting said housing with the source of substance and arranged turnably relative to said housing, said turnable arrangement comprising at least one pin located on said flange, said pin engaging at least one groove located on said housing, each of said first and second communicating means including a throughgoing housing opening and a throughgoing flange opening which in an operative condition communicate and in inoperative condition do not communicate with each other; and sealing means for preventing leaks between said housing and said flange, said sealing means include two separate sealing members each provided in the region of one of said throughgoing housing openings and one of said throughgoing flange openings.

2. A device as defined in claim 1; and further comprising controlling means in said partition opening for controlling a flow of water from said first chamber to said second chamber.

3. A device as defined in claim 2, wherein said controlling means is formed so as to prevent a return flow of the substance into the source of water.

4. A device as defined in claim 3, wherein said controlling means include a control member which is movable between an open position in which it opens said opening in said partition so that the water can flow from said first chamber into said second chamber and closes said openings so that water mixed with substance can not flow from said second chamber into said first chamber and also from the source of substance into said first chamber.

5. A device as defined in claim 4, wherein said control member is spring biased toward said first chamber; and further comprising spring means spring biasing said control member toward said first chamber.

6. A device as defined in claim 5, wherein said opening in said partition has a conical portion facing said second chamber, said control member having a conical surface cooperating with said conical portion to open and to close said opening in said partition correspondingly.

7. A device as defined in claim 2, wherein said controlling means is formed so as to reduce a flow cross-section of said opening when a pressure difference between said first chamber and said second chamber reduces and to increase the flow cross-section of said opening when said pressure difference increases.

8. A device as defined in claim 7, wherein said controlling means is formed as a flexible diaphragm with a passage which reduces and increases in response to elastic deformation of said diaphragm caused by a pressure difference between said first chamber and said second chamber.

9. A device as defined in claim 1; and further comprising means for attaching said housing to the water supply, said attaching means including a nut, and an inner bushing introducable into an end opening of said housing and fixed in said end opening.

10. A device as defined in claim 9; and further comprising a flange connectable with said housing and having an inner polygonal cross-section, said bushing being introducable into an interior of said flange and fixable in said flange.

11. A device as defined in claim 1, wherein at least one said housing and said flange has two recesses, each of said sealing members being arranged in a corresponding one of said recesses, said housing and said flange having a surface of contact over which they contact each other during turning relative to each other, said recesses being offset from said surface of contact into one of said housing and said flange.

* * * * *